(12) United States Patent
Iwahashi (10) Patent No.: US 11,358,653 B2
(45) Date of Patent: Jun. 14, 2022

(54) MEMBER ATTACHMENT STRUCTURE

(71) Applicant: TOYODA GOSEI CO., LTD., Kiyosu (JP)

(72) Inventor: Taichi Iwahashi, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 16/953,873

(22) Filed: Nov. 20, 2020

(65) Prior Publication Data

US 2021/0163075 A1 Jun. 3, 2021

(30) Foreign Application Priority Data

Nov. 29, 2019 (JP) ............................. JP2019-215984

(51) Int. Cl.
*B62D 27/02* (2006.01)

(52) U.S. Cl.
CPC .................. *B62D 27/023* (2013.01)

(58) Field of Classification Search
CPC ... B60K 37/00; B60K 2370/60; B62D 27/023
USPC .......................................... 296/70, 72, 1.08
See application file for complete search history.

(56) References Cited

U.S. PATENT DOCUMENTS

2016/0039270 A1 2/2016 Sawada et al.

FOREIGN PATENT DOCUMENTS

| JP | H07-037732 A | 7/1995 |
| JP | 2016-037229 A | 3/2016 |
| JP | 2016-223674 A | 12/2016 |

*Primary Examiner* — Dennis H Pedder
(74) *Attorney, Agent, or Firm* — Posz Law Group, PLC (57) ABSTRACT

A member attachment structure, in which an attachment member is attached to an attachment receiving plate portion formed on an attachment receiving member, is provided. The attachment member includes an attachment body portion, and an insertion portion configured to be inserted into a wide hole of the attachment receiving plate portion. The insertion portion includes an insertion body portion, and a sandwiching portion configured to sandwich a sandwiched portion of the attachment receiving plate portion together with the attachment body portion from both sides in the height direction. A recess n is formed in one of the attachment member and the attachment receiving plate portion, and a protrusion is formed in the other. One of the attachment member and the attachment receiving plate portion is provided with a locking portion locked to a locked portion provided on the other of the attachment member and the attachment receiving plate portion.

4 Claims, 10 Drawing Sheets

MEMBER ATTACHMENT STRUCTURE

CROSS-REFERENCE TO RELATED APPLICATION(S)

This application is based upon and claims the benefit of priority from prior Japanese patent application No. 2019-215984 filed on Nov. 29, 2019, the entire contents of which are incorporated herein by reference.

BACKGROUND

1. Field of the Invention

The present invention relates to a member attachment structure in which one of two members of a plurality of members constituting a vehicle interior component or the like is used as an attachment receiving member and the other is used as an attachment member, and the attachment member is attached to the attachment receiving member.

2. Description of the Related Art

A cluster having an opening for arranging a functional component such as an air-conditioning register may be arranged in a vehicle interior of a vehicle. The cluster includes a plurality of members, a part of which is formed by two members, an attachment receiving member and an attachment member. The opening is formed by attaching the attachment member to the attachment receiving member. A separate resin clip may be used in order to attach the attachment member to the attachment receiving member in a state in which the attachment member is positioned in a depth direction, a width direction and a height direction with respect to the attachment receiving member (for example, JP-A-2016-37229). In this case, for example, the clip is mounted on the attachment receiving member, and a part of the clip is locked by being inserted into a locking hole provided in the attachment member, whereby the attachment member is attached to the attachment receiving member via the clip.

However, in the attachment structure in which the attachment member is attached to the attachment receiving member by using the separate clip as described above, there is a problem that a large space where the clip is accommodated and elastically deformed is required, and an attachment portion of the attachment member to the attachment receiving member is large in any of the depth direction, the width direction and the height direction.

The present invention has been made in view of the above circumstances, and an object thereof is to provide a member attachment structure capable of reducing a size of an attachment portion of an attachment member to the attachment receiving member.

SUMMARY

According to an aspect of the present invention, there is provided a member attachment structure in which a thickness direction of an attachment receiving plate portion formed on an attachment receiving member is a height direction, two directions orthogonal to the height direction and orthogonal to each other are a depth direction and a width direction, and at least one of an attachment member and the attachment receiving member is moved in the depth direction, whereby the attachment member is attached to the attachment receiving plate portion, where: a narrow hole, a sandwiched portion adjacent to the narrow hole in the width direction, and a wide hole adjacent to the narrow hole and the sandwiched portion in the depth direction are formed in the attachment receiving plate portion; the attachment member includes an attachment body portion, and an insertion portion protruding from the attachment body portion in the height direction and configured to be inserted into the wide hole; the insertion portion includes an insertion body portion configured to slide in the narrow hole in the depth direction as at least one of the attachment member and the attachment receiving member is moved, and a sandwiching portion configured to move with respect to the attachment receiving plate portion in the depth direction together with the insertion body portion and to sandwich the sandwiched portion together with the attachment body portion from both sides in the height direction; a recess extending in the depth direction is formed in one of the attachment member and the attachment receiving plate portion, and a protrusion extending in the depth direction and configured to be fitted in the recess is formed in the other; and one of the attachment member and the attachment receiving plate portion is provided with a locking portion locked to a locked portion provided on the other of the attachment member and the attachment receiving plate portion when the protrusion is fitted up to a deep portion of the recess.

According to the above configuration, when the attachment member is attached to the attachment receiving member, at least one of the attachment member and the attachment receiving member, for example, the attachment member is moved in the depth direction. When the insertion portion reaches an opening of the wide hole during the movement, the sandwiched portion is located on a movement path of the sandwiching portion, and the sandwiched portion tries to prevent the sandwiching portion from moving. The attachment member is moved in the height direction such that the sandwiching portion protrudes from the wide hole in the height direction. The attachment member is moved again in the depth direction with the sandwiching portion protruding from the wide hole. Then, the insertion body portion of the insertion portion slides in the depth direction along a wall surface of the narrow hole, and the sandwiching portion moves in the depth direction on a side opposite to the attachment body portion with the sandwiched portion interposed therebetween. The sandwiching portion sandwiches the sandwiched portion together with the attachment body portion from both sides in the height direction. The protrusion starts to be fitted into the recess during the movement of the attachment member.

When the protrusion is fitted up to the deep portion of the recess in the depth direction as the insertion body portion slides, the locking portion is locked to the locked portion.

The attachment member is restricted from moving in the depth direction by the locked portion to which the locking portion is locked and a wall surface of the deep portion of the recess to which the protrusion is fitted. The attachment member is restricted from moving in the width direction by both wall surfaces in the width direction of the recess to which the protrusion is fitted. The attachment member is restricted from moving in the height direction by the sandwiched portion between the attachment body portion and the sandwiching portion. In this way, the attachment member is attached to the attachment receiving member in a state of being restricted from moving in the depth direction, the width direction and the height direction, that is, being positioned.

In the above configuration, since a separate clip is not used, a space for accommodating and holding the clip, a space where the clip is elastically deformed, and the like are not required.

In the above configuration, the narrow hole, the sandwiched portion and the wide hole, one of the locking portion and the locked portion, and one of the recess and the protrusion are integrated into the attachment receiving plate portion having a plate shape whose thickness direction is the height direction. Therefore, a dimension of an attachment portion at least in the height direction can be reduced as compared with a case where a dimension of the attachment portion in each of the depth direction, the width direction and the height direction is substantially the same as the separate clip is used.

In the above member attachment structure, it is preferable that the locked portion is formed in a portion of the attachment receiving plate portion on a side opposite to the narrow hole and the sandwiched portion with the wide hole interposed therebetween.

According to the above configuration, the locked portion is arranged at substantially the same position as the narrow hole and the sandwiched portion as well as the wide hole in the width direction. Therefore, the dimension of the attachment portion of the attachment member to the attachment receiving member in the width direction can be reduced.

A portion of the attachment receiving plate portion on a side opposite to the narrow hole and the sandwiched portion with the wide hole interposed therebetween is used as a position for forming the locked portion. Therefore, the position for forming the locked portion does not need to be separately provided on the attachment receiving plate portion.

In the above member attachment structure, it is preferable that the locking portion extends in the depth direction on a side opposite to the attachment body portion with the attachment receiving plate portion interposed therebetween, and the locking portion includes a claw portion protruding toward the attachment body portion and configured to be locked by being hooked on the locked portion.

According to the above configuration, when the attachment member is attached to the attachment receiving member, with the sandwiching portion protruding from the wide hole in the height direction, for example, in a case where the attachment member is moved in the depth direction, the insertion body portion slides through the narrow hole, and the claw portion of the locking portion approaches the locked portion. During the approach, the claw portion comes into contact with a portion of the attachment receiving plate portion on the side opposite to the narrow hole and the sandwiched portion with the wide hole interposed therebetween. Even after the contact, when the attachment member is moved in the depth direction, the locking portion is elastically deformed, whereby the claw portion gets on the above portion. When the claw portion gets over the above portion due to the movement, the locking portion tries to return to a shape before getting over the above portion by an elastic restoring force. The claw portion is hooked on the locked portion formed in the above portion, and the locking portion is locked to the locked portion.

In the above member attachment structure, it is preferable that a vehicle is equipped with a cluster having an opening where a functional component is arranged, the attachment member and the attachment receiving member are a part of a plurality of members constituting the cluster, and the opening is formed by attaching the attachment member to the attachment receiving plate portion of the attachment receiving member.

According to the above configuration, the sandwiching portion sandwiches the sandwiched portion together with the attachment body portion from both sides in the height direction, the protrusion is fitted up to the deep portion of the recess, and the locking portion is locked to the locked portion, whereby the attachment member is attached to the attachment receiving member in the state of being restricted from moving in the height direction, the depth direction and the width direction, that is, being positioned. The attachment receiving member and the attachment member attached thereto constitute a part of a cluster mounted on the vehicle, which is a peripheral portion of the opening. In this cluster, an effect of reducing the dimension at least in the height direction of the attachment portion of the attachment member to the attachment receiving member can be obtained.

According to the above member attachment structure, it is possible to reduce the size of the attachment portion of the attachment member to the attachment receiving member.

BRIEF DESCRIPTION OF THE DRAWINGS

The present invention will become more fully understood from the detailed description given hereinbelow and the accompanying drawing which is given by way of illustration only, and thus is not limitative of the present invention and wherein.

DETAILED DESCRIPTION OF THE INVENTION

Hereinafter, an embodiment in which an attachment structure for a member is applied to a cluster such as a center cluster of a vehicle will be described with reference to the drawings.

In the following description, a traveling direction (a forward direction) of the vehicle is a front side, a backward direction is a rear side, and a height direction is an upper-lower direction. A vehicle width direction (a left-right direction) is defined based on a case where the vehicle is viewed from the rear side.

Figure 1:
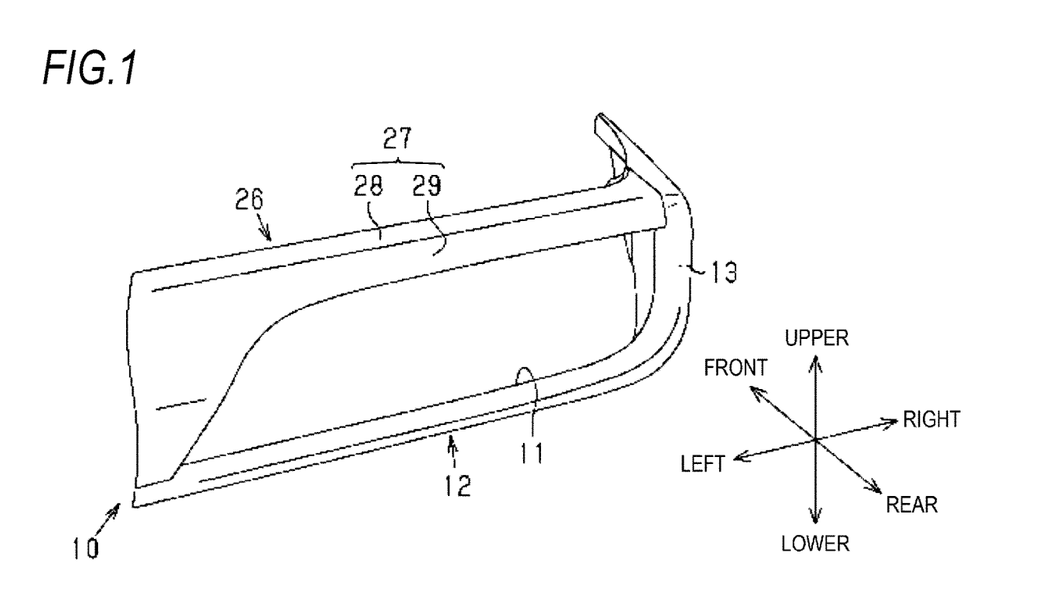
FIG. 1 is a view showing an embodiment in which an member attachment structure is applied to a cluster of a vehicle, and is a partial perspective view of a state in which an attachment member is attached to a attachment receiving member of the cluster to form an opening, as viewed obliquely from a rear upper side.
Figure 2:
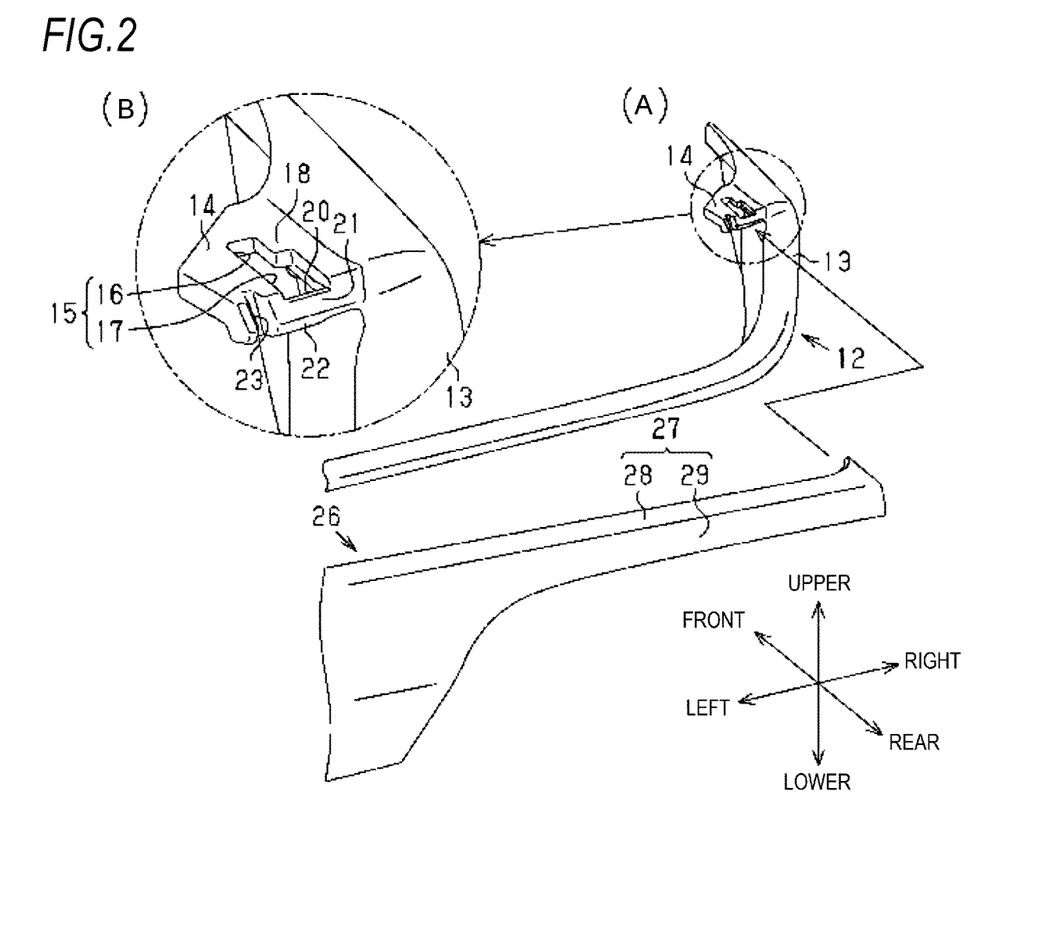
FIG. 2 is a partially exploded perspective view of a state before the attachment member is attached to an attachment receiving plate portion of the attachment receiving member in FIG. 1.
Figure 3:
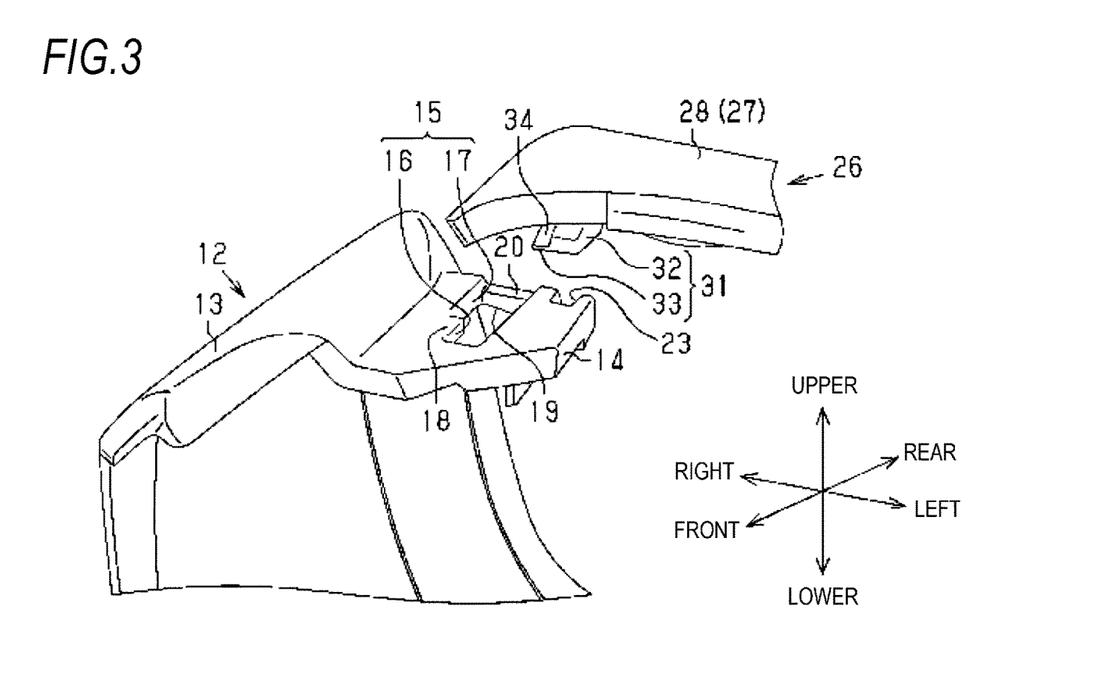
FIG. 3 is a partially exploded perspective view of a state before the attachment member is attached to the attachment receiving plate portion according to the embodiment, as viewed obliquely from a front upper side.
Figure 4:
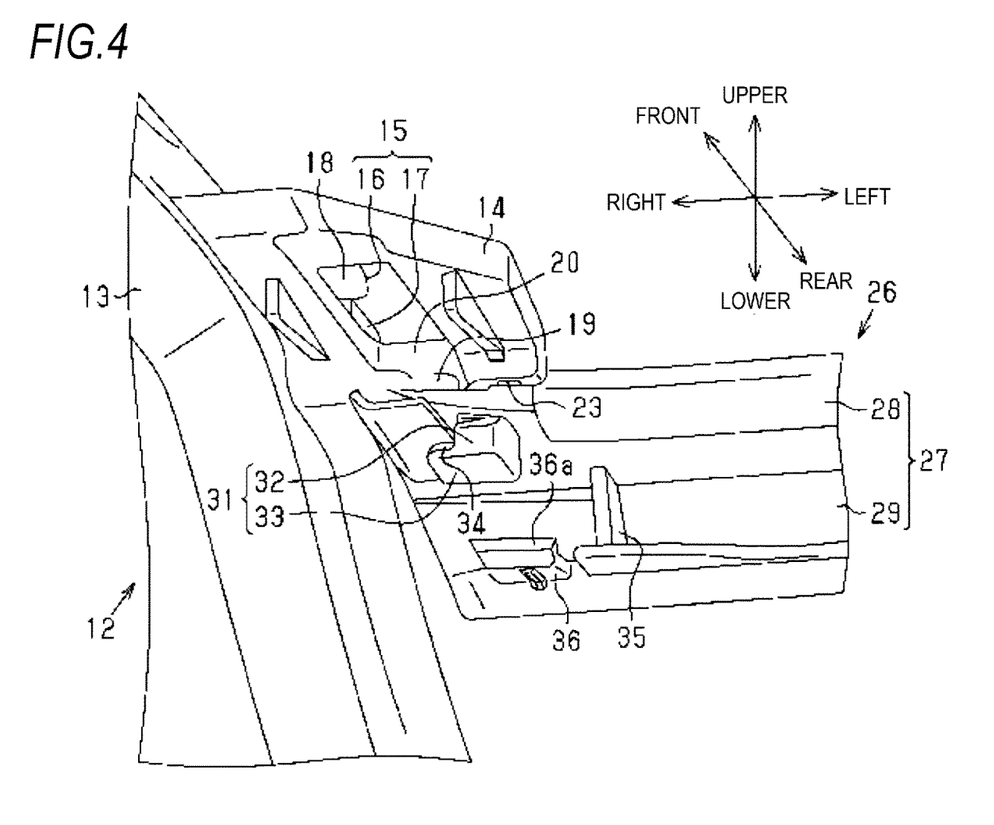
FIG. 4 is a partially exploded perspective view of a state before the attachment member is attached to the attachment receiving plate portion according to the embodiment, as viewed obliquely from a front lower side.

An instrument panel is arranged in a front portion of a vehicle interior of the vehicle, and a main portion thereof is formed by a cluster 10 shown in FIG. 1. An opening 11 for arranging a functional component is formed in the cluster 10. The opening 11 has a shape more elongated in the left-right direction than the upper-lower direction. The cluster 10 includes a plurality of members including two members as an attachment receiving member 12 and an attachment member 26 shown in FIG. 2. Besides, Section (A) of FIG. 2 is a partially exploded perspective view of a state before the attachment member is attached to an attachment receiving plate portion of the attachment receiving member in FIG. 1, as viewed obliquely from the rear upper side, and Section (B) of FIG. 2 is an enlarged partial perspective view of a part in Section (A) of FIG. 2. Both of the attachment receiving member 12 and the attachment member 26 are formed of a resin material. A rear surface of each of the attachment receiving member 12 and the attachment member 26 constitutes a part of a design surface of the cluster 10. In the cluster 10, the opening 11 is formed by attaching the attachment member 26 to the attachment receiving member 12. The attachment member 26 is attached to the attachment receiving member 12 by moving the attachment member 26 from a rear side to a front side of the attachment receiving member 12 and bringing the attachment member 26 and the attachment receiving member 12 close to each other. Although not shown, an air-conditioning register that blows out air-conditioning air sent from an air-conditioning device into the vehicle interior and changes a blowing direction thereof is arranged as the functional component in the opening 11.

Next, a portion related to the attachment in each of the attachment receiving member 12 and the attachment member 26 will be described.

<Attachment Receiving Member 12>

As shown in FIGS. 2, 3, 4 and 7, a plate-shaped attachment receiving plate portion 14 protruding leftward in a substantially horizontal state is formed integrally with an upper end portion of a right side frame portion 13 of the attachment receiving member 12. Here, in order to specify parts of the attachment receiving member 12 and the attachment member 26, a thickness direction of the attachment receiving plate portion 14 is the height direction, and two directions orthogonal to the height direction and orthogonal to each other are a depth direction and a width direction. In this embodiment, the vehicle width direction (the left-right direction) corresponds to the width direction, a front-rear direction corresponds to the depth direction, and the upper-lower direction corresponds to the height direction.

The attachment receiving plate portion 14 has a narrow hole 16, a sandwiched portion 18 adjacent to one side of the narrow hole 16 in the left-right direction, a right side in this embodiment, and a wide hole 17 adjacent to a rear side of the narrow hole 16 and the sandwiched portion 18. The narrow hole 16 and the wide hole 17 form a locking hole 15 penetrating the attachment receiving plate portion 14 in the upper-lower direction.

A portion of the attachment receiving plate portion 14 on a side opposite to the narrow hole 16 and the sandwiched portion 18 with the wide hole 17 interposed therebetween, that is, a portion rearward than the wide hole 17, is referred to as a rear frame portion 20 of the attachment receiving plate portion 14. The rear frame portion 20 has a shape elongated in the left-right direction, and constitutes a part of a rear end portion of the attachment receiving plate portion 14. In the present embodiment, a locked portion 19 is formed at a front lower end portion of the rear frame portion 20.

A lower portion of a rear end surface of the rear frame portion 20 is formed by a lower inclined surface 22. The lower inclined surface 22 is inclined with respect to the front-rear direction so as to be farther away from an attachment body portion 28 described later toward the front side, that is, lower toward the front side.

An upper portion of the rear end surface of the rear frame portion 20 is formed by an upper inclined surface 21. The upper inclined surface 21 is inclined with respect to the front-rear direction so as to be farther away from the attachment body portion 28 toward the rear side in the front-rear direction, that is, lower toward the rear side.

Figure 10:
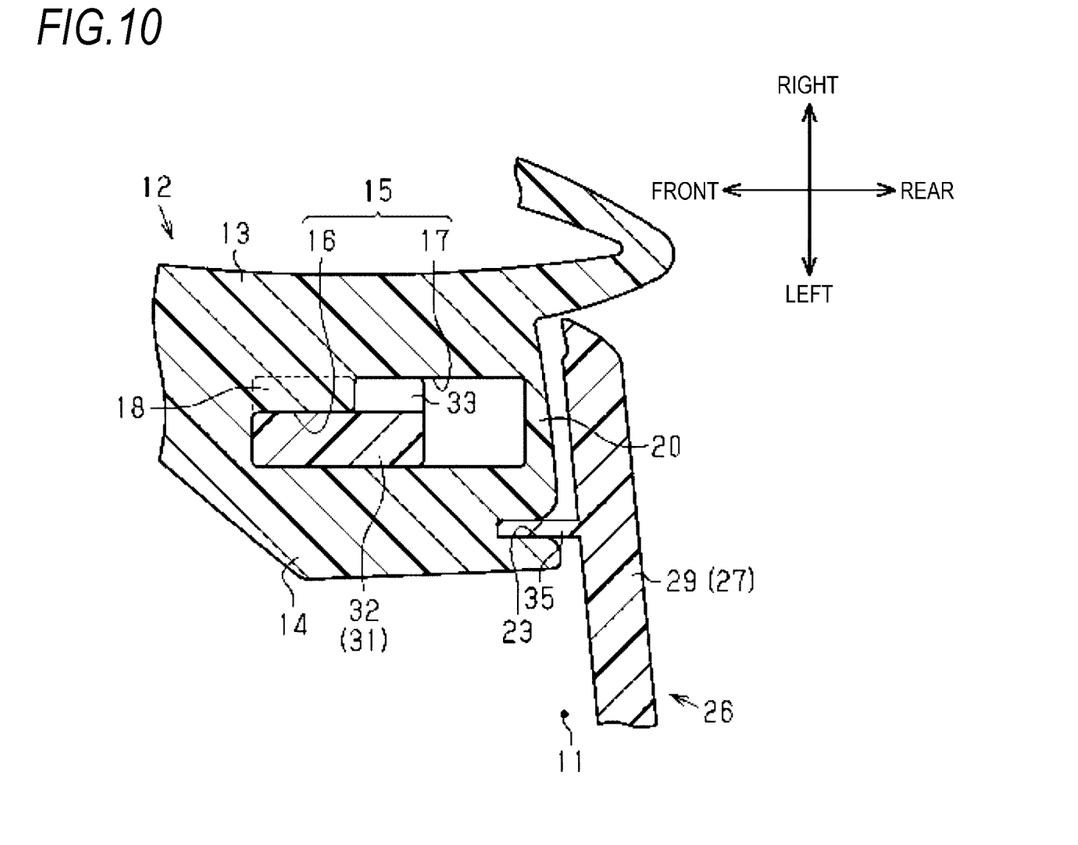
FIG. 10 is a sectional view taken along line 10-10 in FIG. 9.

A recess 23 extending (recessed) forward from the rear end surface is formed at a position adjacent to a left side of the wide hole 17 and the rear frame portion 20 at the rear end portion of the attachment receiving plate portion 14 (see FIG. 10). The recess 23 is formed over the entire region of the attachment receiving plate portion 14 in the upper-lower direction.

<Attachment Member 26>

Figure 5:
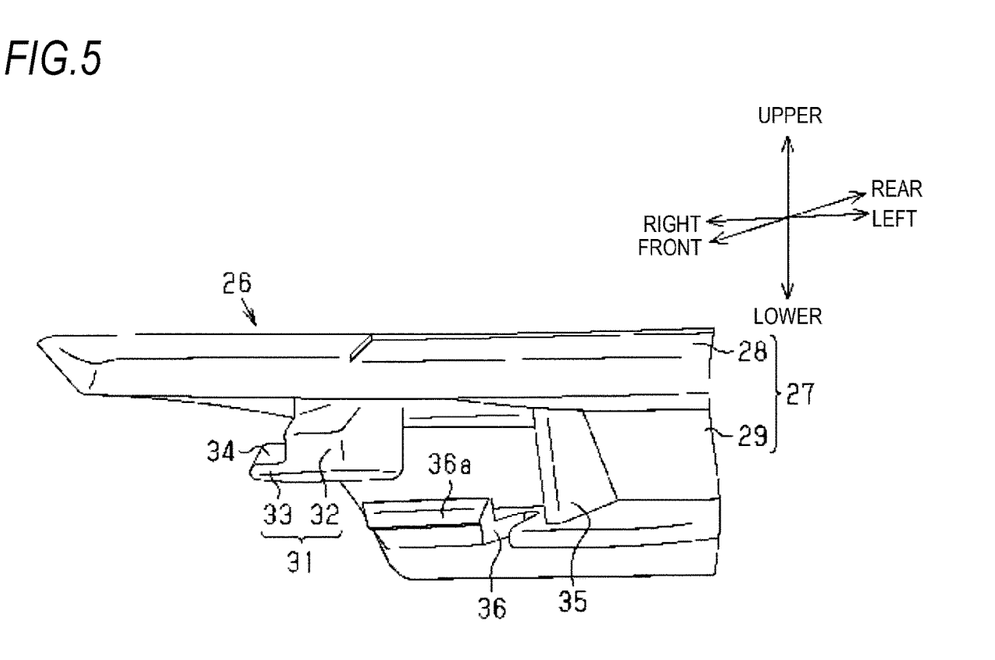
FIG. 5 is a partial perspective view of the attachment member according to the embodiment as viewed obliquely from the front upper side.
Figure 6:
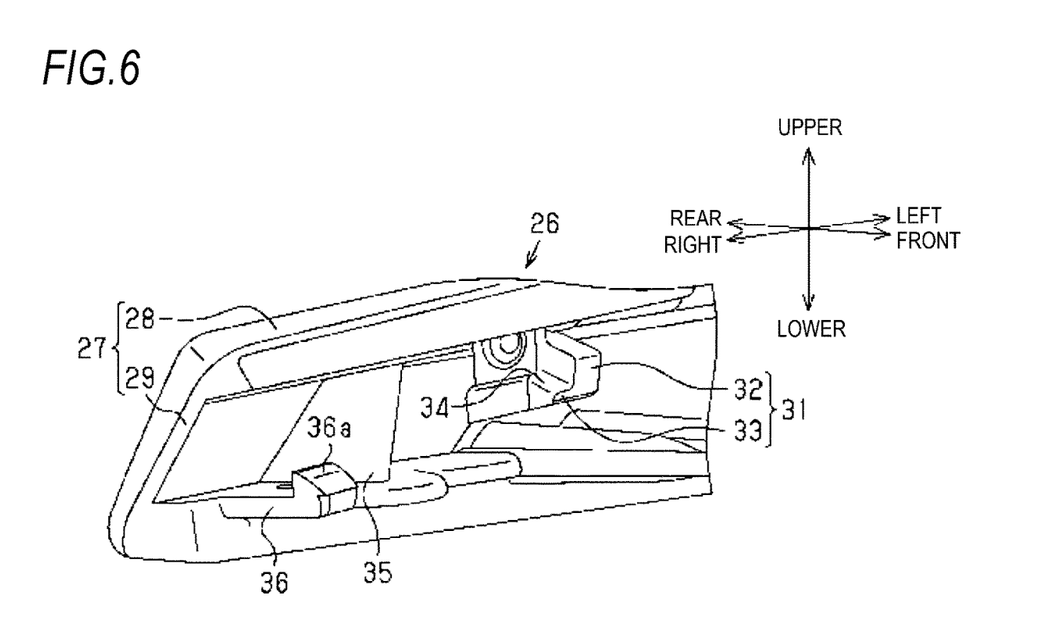
FIG. 6 is a partial perspective view of the attachment member according to the embodiment obliquely forward and viewed from a direction different from that of FIG. 5.
Figure 7:
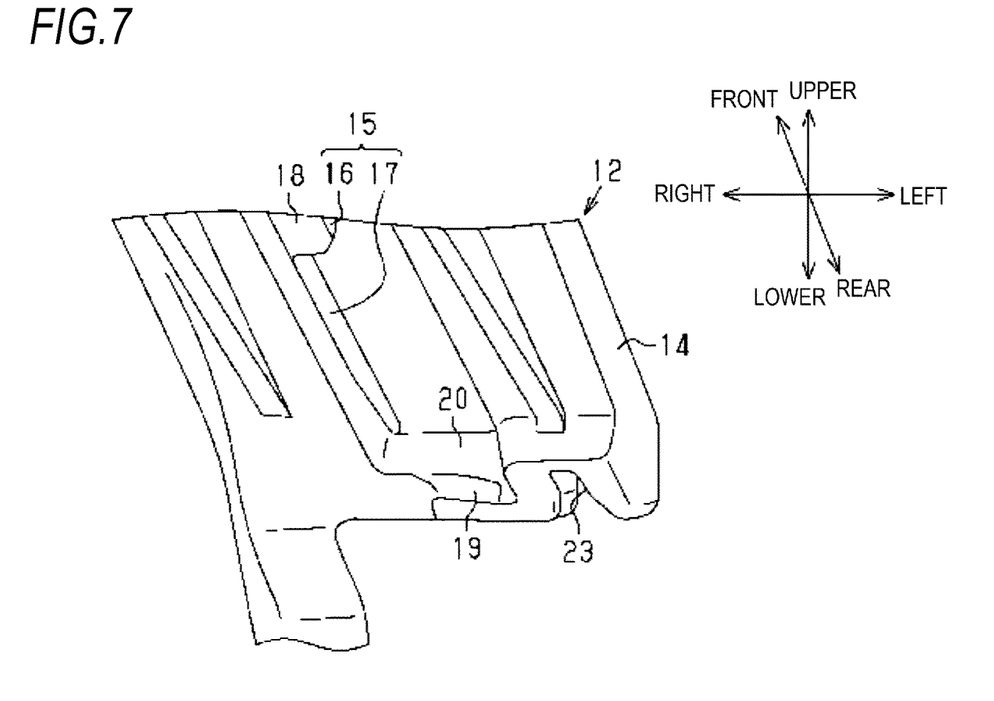
FIG. 7 is a partial perspective view of a part of the attachment receiving plate portion of the attachment receiving member according to the embodiment, as viewed obliquely from the front lower side.
Figure 9:
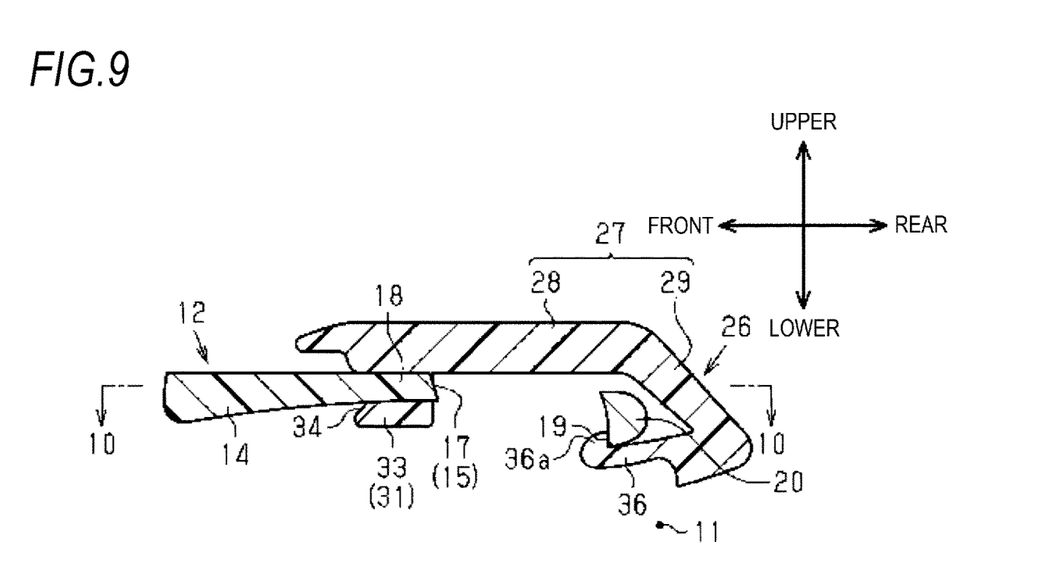
FIG. 9 is a sectional view taken along line 9-9 in FIG. 8.

As shown in FIGS. 2, 5 and 6, in the attachment member 26, an upper frame portion 27 elongated in the left-right direction is formed at a position above the opening 11. As shown in FIGS. 6 and 9, the upper frame portion 27 includes the attachment body portion 28 extending in the left-right direction in a substantially horizontal state and an inclined portion 29 extending in the left-right direction in a state of being inclined with respect to the attachment body portion 28 so as to be lower toward the rear side. The inclined portion 29 is connected to a rear end portion of the attachment body portion 28 at an upper end portion of the inclined portion 29.

As shown in FIGS. 4 to 6 and 10, an insertion portion 31 to be locked in the locking hole 15 of the attachment receiving plate portion 14, a protrusion 35 to be fitted to the recess 23, and a locking portion 36 to be locked to the locked portion 19 are formed at a right end portion of the attachment member 26, which is behind the attachment receiving plate portion 14.

The insertion portion 31 protrudes downward from the attachment body portion 28. The insertion portion 31 has a shape and a size capable of being inserted through the wide hole 17 in the upper-lower direction. More specifically, a dimension of the insertion portion 31 in the left-right direction is set to be slightly smaller than a dimension of the wide hole 17 in the same direction. In addition, the dimension of the insertion portion 31 in the front-rear direction is set to be slightly smaller than a dimension of the wide hole 17 in the same direction. The insertion portion 31 includes an insertion body portion 32 and a sandwiching portion 33. The insertion body portion 32 is formed to be slightly narrower in the left-right direction than the narrow hole 16, and when the attachment member 26 is moved in the front-rear direction, the insertion body portion 32 can slide in the narrow hole 16 in the front-rear direction along with the movement. The sandwiching portion 33 is a lower end portion of the insertion body portion 32, extends rightward from the entire region of the insertion body portion 32 in the front-rear direction, and has a plate shape. The sandwiching portion 33 moves in the front-rear direction together with the insertion body portion 32, and can sandwich the sandwiched portion 18 together with the attachment body portion 28 from both sides in the upper-lower direction.

An upper surface of a front end portion of the sandwiching portion 33 is formed by an inclined surface 34. The inclined surface 34 is inclined with respect to the front-rear direction so as to be farther away from the sandwiched portion 18 toward the front side, that is, lower toward the front side.

The protrusion 35 is a front surface of the inclined portion 29, and extends forward from a position behind the recess 23 of the attachment receiving plate portion 14. The protrusion 35 has a plate shape with the left-right direction as an own thickness direction. The protrusion 35 is fitted to the recess 23 as the insertion body portion 32 slides forward. A dimension of the protrusion 35 in the front-rear direction is set such that the protrusion 35 can be fitted up to a front end portion as a deep portion of the recess 23 when the attachment member 26 is attached to the attachment receiving member 12.

The locking portion 36 is a front surface of the inclined portion 29, and extends forward from a position behind the locked portion 19 of the attachment receiving plate portion 14. The locking portion 36 is located on a side opposite to the attachment body portion 28 with the attachment receiving plate portion 14 interposed therebetween, that is, below the attachment receiving plate portion 14. The locking portion 36 has a claw portion 36a that protrudes upward and is locked to the locked portion 19 by being hooked from below at a position that satisfies the following condition at a front end portion of the locking portion 36. The condition is that the claw portion 36a is locked to the locked portion 19 when the protrusion 35 is fitted up to the deep portion (the front end portion) of the recess 23.

Next, an action according to the present embodiment configured as described above will be described. In addition, effects caused by the action will also be described. The attachment member 26 is attached to the attachment receiving member 12 as follows, for example. The attachment member 26 is moved to the attachment receiving member 12 from the rear side to the front side. Along with this movement, each of the insertion portion 31, the locking portion 36 and the protrusion 35 of the attachment member 26 approaches the attachment receiving plate portion 14. During the movement, the insertion portion 31 comes into contact with the upper inclined surface 21 of the rear frame portion 20 of the attachment receiving plate portion 14. The upper inclined surface 21 is inclined with respect to the front-rear direction so as to be farther away from the attachment body portion 28 to toward the rear side, that is, lower toward the rear side. Therefore, the insertion portion 31 easily comes into contact with the upper inclined surface 21. When the attachment member 26 is moved forward even after the insertion portion 31 comes into contact with the upper inclined surface 21, along with the movement, the insertion portion 31 is gradually raised by sliding on the upper inclined surface 21, and is brought closer to an upper opening of the wide hole 17 in the attachment receiving plate portion 14. After passing through the upper inclined surface 21, the insertion portion 31 reaches the upper opening. In this way, the insertion portion 31 is guided to the upper opening of the wide hole 17 by the upper inclined surface 21.

When the insertion portion 31 reaches the upper opening, the sandwiched portion 18 is located in front of the sandwiching portion 33, and the sandwiched portion 18 comes into contact with the sandwiching portion 33, thereby preventing the sandwiching portion 33 from moving further forward. Therefore, the attachment member 26 is moved downward until the sandwiching portion 33 protrudes downward from the wide hole 17. Then, the sandwiched portion 18 and the sandwiching portion 33 are displaced in the upper-lower direction, thereby preventing the sandwiching portion 33 from moving forward. With the sandwiching portion 33 protruding downward from the wide hole 17, the attachment member 26 is moved forward again. The insertion body portion 32 of the insertion portion 31 slides forward along a wall surface of the narrow hole 16.

Here, the inclined surface 34 on an upper side of the front end portion of the sandwiching portion 33 comes into contact with a rear end portion of the sandwiched portion 18. The inclined surface 34 is inclined with respect to the front-rear direction so as to be lower toward the front side. Therefore, when the attachment member 26 is moved forward even after the sandwiching portion 33 comes into contact with the sandwiched portion 18 on the inclined surface 34, the sandwiching portion 33 is guided to a lower side opposite to the attachment body portion 28 with the sandwiched portion 18 interposed therebetween along with the movement. The sandwiching portion 33 sandwiches the sandwiched portion 18 together with the attachment body portion 28 from both sides in the upper-lower direction.

The protrusion 35 starts to be fitted to the recess 23 during the movement of the attachment member 26. Further, the claw portion 36a of the locking portion 36 approaches the locked portion 19 as the insertion body portion 32 slides forward. During the approach, the claw portion 36a comes into contact with the lower inclined surface 22 on a lower side of the rear end surface of the rear frame portion 20. The lower inclined surface 22 is inclined with respect to the same depth direction so as to be farther away from the attachment body portion 28 toward the front side, that is, lower toward the front side. Therefore, when the attachment member 26 is moved forward even after the claw portion 36a comes into contact with the lower inclined surface 22, the locking portion 36 is gradually elastically deformed and the claw portion 36a gets on the rear frame portion 20 along with the movement.

Figure 8:
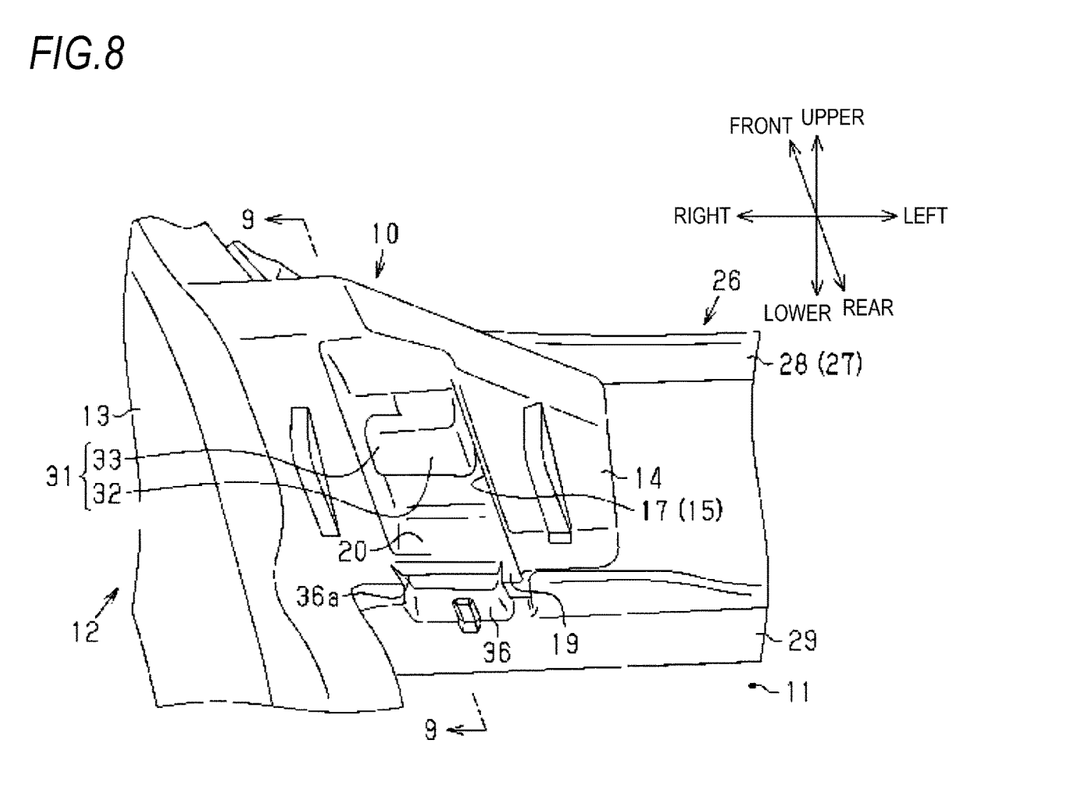
FIG. 8 is a partial perspective view of a state in which the attachment member is attached to the attachment receiving plate portion according to the embodiment, as viewed obliquely from the front lower side.

The claw portion 36a gets over the rear frame portion 20 substantially at the same time when the protrusion 35 is fitted up to the deep portion of the recess 23, as the insertion body portion 32 slides. Then, the locking portion 36 tries to return to a shape before getting over the rear frame portion 20 by an elastic restoring force. As shown in FIG. 8, the claw portion 36a is hooked on the locked portion 19 from below, and is locked to the locked portion 19. As the claw portion 36a slides on the lower inclined surface 22, the locking portion 36 is gradually elastically deformed as the attachment member 26 moves forward, so that the claw portion 36a can smoothly get over the rear frame portion 20 as compared with a case of being elastically deformed at once.

As shown in FIGS. 9 and 10, the attachment member 26 is restricted from moving in the front-rear direction by the locked portion 19 to which the claw portion 36a of the locking portion 36 is locked and a wall surface of the deep portion of the recess 23 to which the protrusion 35 is fitted. The attachment member 26 is restricted from moving in the left-right direction by both wall surfaces in the left-right direction of the recess 23 to which the protrusion 35 is fitted. The attachment member 26 is restricted from moving in the upper-lower direction by the sandwiched portion 18 between the attachment body portion 28 and the sandwiching portion 33. In this way, the attachment member 26 is attached to the attachment receiving member 12 in a state of being restricted from moving in any of the front-rear direction, the left-right direction and the upper-lower direction, that is, being positioned.

As described above, according to the present embodiment, by simply moving the attachment member 26 from the rear side to the front side of the attachment receiving member 12 and bringing the attachment member 26 and the attachment receiving member 12 close to each other, the attachment member 26 can be attached to the attachment receiving member 12 at the attachment receiving plate portion 14, and workability and work efficiency of the attachment may be improved.

In the present embodiment, since a separate clip is not used, a space for accommodating and holding the clip, a space where the clip is elastically deformed, and the like are not required. In addition, the locking hole 15, the locked portion 19 and the recess 23 for attaching the attachment member 26 to the attachment receiving member 12 are integrated into the attachment receiving plate portion 14 having a plate shape with the upper-lower direction as the thickness direction. Therefore, a dimension of an attachment portion in the upper-lower direction can be reduced as compared to a case where a dimension of the attachment portion in each of the depth direction, the width direction and the height direction is substantially the same (the related-art technology using the separate clip corresponds to this). A size of the attachment portion of the attachment member 26 to the attachment receiving member 12 can be reduced.

As described above, since the attachment portion is small, influence of the attachment portion on a design of the cluster 10 is reduced. Degree of freedom in the design of the cluster 10 can be increased accordingly.

According to the present embodiment, the following effects can be obtained in addition to the above.

In the present embodiment, the locked portion 19 is formed in a portion of the attachment receiving plate portion 14 on the side opposite to the narrow hole 16 and the sandwiched portion 18 with the wide hole 17 interposed therebetween, that is, in the rear frame portion 20 rearward than the wide hole 17. In the present embodiment, the rear frame portion 20 is used as a position for forming the locked portion 19. Therefore, the position for forming the locked portion 19 does not need to be separately provided on the attachment receiving plate portion 14.

The locked portion 19 and the locking hole 15 are formed at substantially the same position in the left-right direction. In addition to this, the recess 23 is formed at a positon adjacent to a lateral side of the locking hole 15 and the locked portion 19. Therefore, a dimension of the attachment receiving plate portion 14 in the left-right direction is small. The dimension of the attachment portion of the attachment member 26 to the attachment receiving member 12 in the left-right direction can be reduced. In this respect, the size of the attachment portion can further reduced in the present embodiment.

The above embodiment can also be implemented as modifications modified as follows. The above embodiment and the following modifications can be implemented in combination with each other as long as they do not have technical contradiction.

At least one of the attachment receiving member 12 and the attachment member 26 may be formed of a material different from resin.

The attachment receiving plate portion 14 may be formed by a member different from other portions of the attachment receiving member 12. At least one of the insertion portion 31, the protrusion 35 and the locking portion 36 may be formed by a member different from other portions of the attachment member 26.

The attachment receiving plate portion 14 may be arranged in a mode different from that according to the above embodiment. For example, the attachment receiving plate portion 14 may be arranged such that the thickness direction thereof is the left-right direction. The attachment receiving plate portion 14 may be arranged in a state of being inclined with respect to both a horizontal direction and a vertical direction.

The locked portion 19 may be formed at a position different from the rear frame portion 20 of the attachment receiving plate portion 14.

Contrary to the above embodiment, the recess 23 may be formed in the attachment member 26, and the protrusion 35 may be formed in the attachment receiving plate portion 14.

Two or more combinations of the recess 23 and the protrusion 35 may be provided.

The sandwiched portion 18 of the attachment receiving plate portion 14 may be formed on a left side instead of the right side of the narrow hole 16. The sandwiched portions 18 may be formed on both sides of the narrow hole 16 in the left-right direction. In the former case, the sandwiching portion 33 of the insertion portion 31 is formed on a left side of the insertion body portion 32, and in the latter case, the sandwiching portions 33 are formed on both sides in the left-right direction.

The wide hole 17 may be formed at a position adjacent to the narrow hole 16 and the sandwiched portion 18 on a front side.

Contrary to the above embodiment, the locking portion 36 may be provided on the attachment receiving plate portion 14, and the locked portion 19 may be provided on the attachment member 26.

Contrary to the above embodiment, the member indicated by reference numeral 26 may be the attachment receiving member, and the member indicated by reference numeral 12 may be the attachment member.

When the attachment member 26 is attached to the attachment receiving member 12, the attachment receiving member 12 instead of the attachment member 26 may be moved toward a side closer to the attachment member 26 in the front-rear direction, or both the attachment member 26 and the attachment receiving member 12 may be moved closer to each other.

On the contrary, the attachment member 26 may be attached to the attachment receiving member 12 by moving at least one of the attachment member 26 and the attachment receiving member 12 in directions away from each other.

The above member attachment structure can be applied to a vehicle interior component different from the cluster, for example, a general instrument panel and a console box that do not have clusters.

The above member attachment structure can be applied to a product different from the vehicle interior component, provided that the product includes a plurality of members, and one of two members thereof is an attachment receiving member having an attachment receiving plate portion, and the other is an attachment member.

What is claimed is:

1. A member attachment structure in which a thickness direction of an attachment receiving plate portion formed on an attachment receiving member is a height direction, two directions orthogonal to the height direction and orthogonal to each other are a depth direction and a width direction, and at least one of an attachment member and the attachment receiving member is moved in the depth direction, whereby the attachment member is attached to the attachment receiving plate portion, wherein:
- a narrow hole, a sandwiched portion adjacent to the narrow hole in the width direction, and a wide hole adjacent to the narrow hole and the sandwiched portion in the depth direction are formed in the attachment receiving plate portion;
- the attachment member includes an attachment body portion, and an insertion portion protruding from the attachment body portion in the height direction and configured to be inserted into the wide hole;
- the insertion portion includes an insertion body portion configured to slide in the narrow hole in the depth direction as at least one of the attachment member and the attachment receiving member is moved, and a sandwiching portion configured to move with respect to the attachment receiving plate portion in the depth direction together with the insertion body portion and to sandwich the sandwiched portion together with the attachment body portion from both sides in the height direction;
- a recess extending in the depth direction is formed in the attachment receiving plate portion, and a protrusion extending in the depth direction and configured to be fitted in the recess is formed in the attachment member; and
- the attachment member is provided with a locking portion locked to a locked portion provided on the attachment receiving plate portion when the protrusion is fitted up to a deep portion of the recess.

2. The member attachment structure according to claim 1, wherein
the locked portion is formed in a portion of the attachment receiving plate portion on a side opposite to the narrow hole and the sandwiched portion with the wide hole interposed therebetween.

3. The member attachment structure according to claim 2, wherein:
- the locking portion extends in the depth direction on a side opposite to the attachment body portion with the attachment receiving plate portion interposed therebetween; and
- the locking portion includes a claw portion protruding toward the attachment body portion and configured to be locked by being hooked on the locked portion.

4. The member attachment structure according to claim 1, wherein:
- a vehicle is equipped with a cluster having an opening;
- the attachment member and the attachment receiving member are a part of a plurality of members constituting the cluster; and
- the opening is formed by attaching the attachment member to the attachment receiving plate portion of the attachment receiving member.

* * * * *